United States Patent [19]

Nishimori et al.

[11] Patent Number: 5,412,532
[45] Date of Patent: May 2, 1995

[54] POLYGONAL CAPACITOR

[75] Inventors: Toshiyuki Nishimori, Toyama; Akinori Asahara, Tonami, both of Japan

[73] Assignee: Matsushita Electric Industrial Co., Ltd., Kadoma, Japan

[21] Appl. No.: 116,497

[22] Filed: Sep. 3, 1993

[30] Foreign Application Priority Data

Nov. 24, 1992 [JP] Japan .................. 4-313057

[51] Int. Cl.⁶ .................. H01G 1/14; H01G 4/00
[52] U.S. Cl. .................. 361/306.1; 361/539; 361/538; 361/301.3; 361/301.5; 174/52.2; 29/25.42; 29/25.03
[58] Field of Search .................. 361/535–540, 361/529, 323, 324, 523, 511, 533, 534, 301.3, 301.5, 530, 306.1; 174/52.1, 52.2; 29/25.42, 25.03; 206/328, 331, 333, 334

[56] References Cited

U.S. PATENT DOCUMENTS

| | | | |
|---|---|---|---|
| 1,900,352 | 7/1929 | Lewis | 361/306.1 |
| 3,222,450 | 12/1965 | Lee et al. | 361/540 |
| 3,838,316 | 9/1974 | Brown et al. | 174/52.2 |
| 4,255,779 | 3/1981 | Meal | 361/540 |
| 4,594,644 | 6/1986 | Painter | 174/52.2 |

FOREIGN PATENT DOCUMENTS

| | | | |
|---|---|---|---|
| 2802688 | 7/1979 | Germany | 361/306.1 |
| 0233918 | 10/1991 | Japan | 361/306.1 |

Primary Examiner—Bruce A. Reynolds
Assistant Examiner—Michael D. Switzer
Attorney, Agent, or Firm—Renner, Otto, Boisselle & Sklar

[57] ABSTRACT

A polygonal capacitor including a polygonal capacitor case having an engaging portion at an inner surface thereof; a capacitor element accommodated in the polygonal capacitor case; a plurality of terminals respectively connected to a plurality of electrodes of the capacitor element through a base portion of each terminal; an insulating terminal base to which the terminals are fixed; and a resin filled in the polygonal capacitor case. An engaging member formed at the insulating terminal base is in pressure contact with the engaging portion of the polygonal capacitor case.

7 Claims, 2 Drawing Sheets

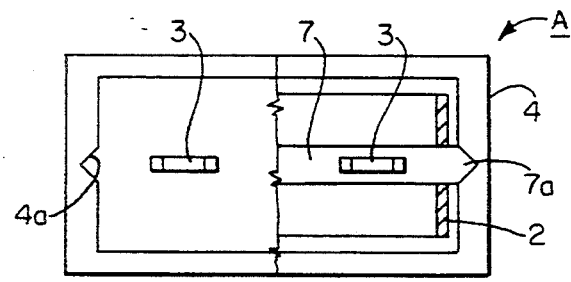
FIG. IA
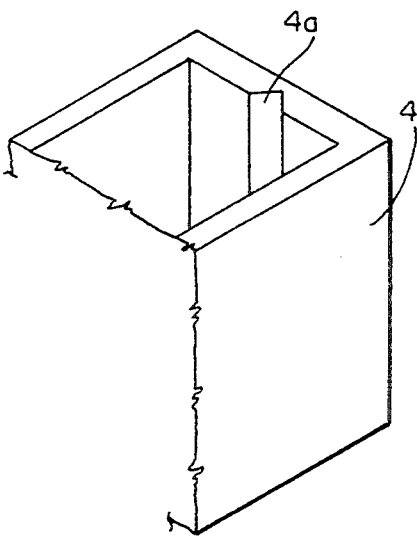
FIG. IC
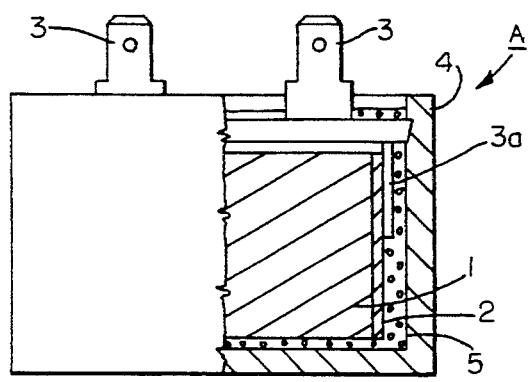
FIG. IB
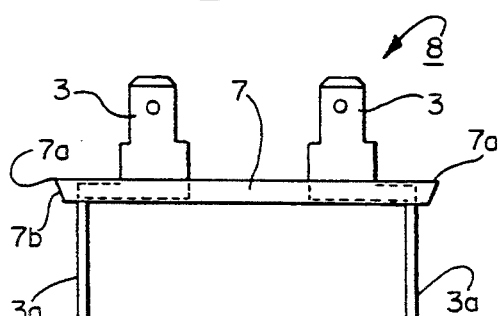
FIG. 2
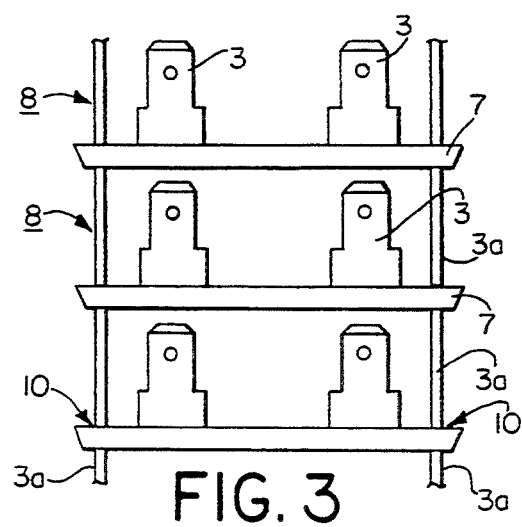
FIG. 3
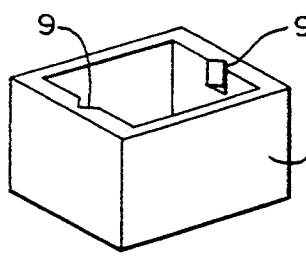
FIG. 4
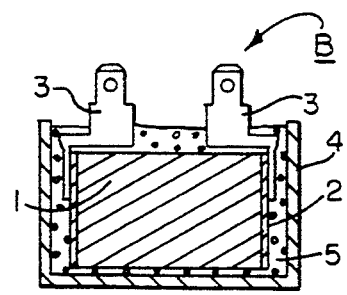
FIG. 5
PRIOR ART
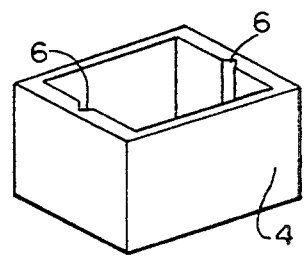
FIG. 6
PRIOR ART

POLYGONAL CAPACITOR

BACKGROUND OF THE INVENTION

1. Field of the Invention

The present invention relates to a polygonal capacitor having terminals positioned with an improved precision.

2. Description of the Related Art

Capacitors for use in small electric apparatuses or electronic apparatuses include, for example, dip-type capacitors produced by directly coating a capacitor element with an insulating material and another type of capacitors having a capacitor element accommodated in a cylindrical or polygonal case formed of a metal or a resin.

A capacitor having a capacitor element accommodated in a case is easily attached to an electric or electronic apparatus through a hole formed in the case. Further, due to highly precise outer dimensions of the case, such a capacitor is easily and further automatically accommodated in the apparatus.

Whether a cylindrical case or a polygonal case is to be used is determined in consideration of the shape of the capacitor element, efficiency in usage of space and the like. More practically, a capacitor element produced by winding an insulating film having a metal evaporated thereof into a roll is generally accommodated in a cylindrical case. A capacitor element produced by laminating such insulating films or an oblong capacitor element having two linear sides and two arc sides is generally accommodated in a polygonal case.

An electrode of the capacitor element is connected to a terminal of the capacitor through a lead or directly.

For attaching such a capacitor to a precision component and especially for automatically performing such an attachment, positioning-precision with which the terminal is positioned with respect to the case is critical.

In the case of a capacitor element accommodated in a cylindrical case, the positioning precision is not very critical since the case is attached to the component while being rotated. A capacitor element accommodated in a polygonal case involves specific problems since it is required to determine the position of the terminal from a longitudinal side and a transverse side of the case.

FIG. 5 shows a conventional metallized film capacitor using a polygonal case.

A capacitor B includes a capacitor element 1 produced formed of a metallized film, a case 4 accommodating the capacitor element 1 and formed of a resin, and a resin 5 injected between the case 4 and the capacitor element 1. The capacitor element 1 has metal layers 2 formed on two side surfaces thereof to be connected to electrodes of the capacitor element 1. The metal layers 2 are formed of a metal by metallikon. The capacitor element 1 has terminals 3, which are welded to the metal layers 2, respectively, through base portions of the terminals 3.

The capacitor B is produced by putting capacitor element 1 having the terminals 3 into the case 4, injecting the resin 5 into the case 4 and then curing the resin 5.

In such a conventional capacitor B, it is difficult to put the capacitor element 1 so that the terminals 3 are precisely positioned as specified with respect to the case 4. Examples of the reasons for the difficulty are: (1) the positional connection between the terminals 3 and the capacitor element 1 is not sufficiently accurate; and (2) the terminals 3 are positionally displaced with respect to the case 4 when the capacitor element 1 is put into the case 4. Further, care should be taken to prevent the capacitor element 1 from moving in the case 4 when the resin 5 is injected into the case 4, in order to maintain the positional precision of the terminals 3 with respect to the case 4.

FIGS. 6 through 8 show another conventional capacitor. In this capacitor, grooves 6 are formed at inner surfaces of the case 4, and an end portion of each terminal 3 is inserted into the groove 6. Such a construction can prevent the movement of the terminals 3 in an X direction (FIG. 7) along the inner surfaces of the case 4, but cannot prevent the terminal 3 from slanting in a Y direction as is shown in FIG. 9 or from moving in a Z direction as is shown in FIG. 10.

SUMMARY OF THE INVENTION

A polygonal capacitor according to the present invention includes a polygonal capacitor case having an engaging portion at an inner surface thereof; a capacitor element accommodated in the polygonal capacitor case; a plurality of terminals respectively connected to a plurality of electrodes of the capacitor element through a base portion of each terminal; an insulating terminal base to which the terminals are fixed; and a resin filled in the polygonal capacitor case. An engaging member formed at the insulating terminal base is in pressure contact with the engaging portion of the polygonal capacitor case.

In a preferred embodiment of the invention, the terminals and the insulating terminal base are integrally molded in a state where the terminals are inserted into the insulating terminal base.

In a preferred embodiment of the invention, the engaging portion is a groove extended from a perimeter of an opening of the case in a direction substantially perpendicular to the perimeter, and the engaging member of the insulating terminal base is a projection.

In a preferred embodiment of the invention, two such terminals are fixed to the insulating terminal base, and the base portion of each terminal is a leg portion which is connected to the respective electrode of the capacitor element.

In a preferred embodiment of the invention, the terminals and the insulating terminal base are obtained from a component assembly including a plurality of terminal attachment members, each having at least two such terminals and such an insulating terminal base.

Alternatively a polygonal capacitor according to the present invention includes a polygonal capacitor case; a capacitor element accommodated in the polygonal capacitor case; a plurality of terminals respectively connected to a plurality of electrodes of the capacitor element; and an insulating resin filled in the polygonal capacitor case. The terminals are fixed to an insulating terminal base and are respectively connected to the electrodes of the capacitor element through a base portion thereof. The capacitor element is accommodated in the polygonal capacitor case in a state where an engaging projection formed at the insulating terminal base is in pressure contact with an engaging groove formed at an inner surface of the polygonal capacitor case.

Alternatively, a polygonal capacitor according to the present invention includes a capacitor element having a plurality of metal layers, each acting as an electrode; a plurality of terminals respectively connected to the metal layers of the capacitor element; a polygonal capacitor case accommodating the capacitor element; and an insulating resin filled between the polygonal capacitor case and the capacitor element. The terminals and an insulating terminal base formed of a resin are integrally molded and used as a terminal attachment member in a state where the terminals are inserted into the insulating terminal base. The insulating terminal base has an engaging member. The polygonal terminal case has an engaging portion formed at an inner surface thereof, the engaging portion being engageable with the engaging member. The terminals of the terminal attachment member are respectively connected to the metal layers of the capacitor element. The capacitor element is accommodated in the polygonal capacitor case in a state where the engaging member of the insulating terminal base is in engagement with the engaging portion.

According to the present invention, a capacitor element welded with terminals fixed to an insulating terminal base is accommodated in a case formed of a resin. When the capacitor element is put into the case, an engaging member of the insulating terminal base is pressed to an engaging portion formed at an inner surface of the case. Since the positional relationship between the terminals and the case is constantly maintained, a polygonal capacitor having terminals which can be positioned with respect to an electric or electronic apparatus at a high precision is obtained.

Further, due to the engagement between the insulating terminal base and the case, the capacitor element is not moved when a resin is injected into the case.

In a case when a component assembly is used including a plurality of terminal attachment members, each having two terminals and an insulating terminal base, the terminal attachment members can automatically be supplied one by one, thereby improving the production efficiency of the capacitors.

Thus, the invention described herein makes possible the advantages of providing (1) a polygonal capacitor which allows easy and highly precise positioning of a terminal and thus is easily accommodated in or attached to an electric or electronic apparatus; and (2) a polygonal capacitor which is easily attached to an electric or electronic apparatus in an automatic process to realize a high production efficiency.

These and other advantages of the present invention will become apparent to those skilled in the art upon reading and understanding the following detailed description with reference to the accompanying figures.

BRIEF DESCRIPTION OF THE DRAWINGS

FIG. 1A is a partially cut plan view of a polygonal capacitor according to an example of the present invention.

FIG. 1B is a partially cut front view of the capacitor shown in FIG. 1A.

FIG. 1C is a partial perspective view of a case of the capacitor shown in FIG. 1A.

FIG. 2 is a front view of a terminal attachment component used for attaching terminals to the case of the capacitor shown in FIG. 1A.

FIG. 3 is a front view of a component assembly including a plurality of such terminal attachment components as shown in FIG. 2.

FIG. 4 is a perspective view of a case of a capacitor according to another example of the present invention.

FIG. 5 is a vertical cross sectional view of a conventional polygonal capacitor.

FIG. 6 is a perspective view of a case of a different conventional polygonal capacitor.

DESCRIPTION OF THE PREFERRED EMBODIMENTS

Figure 7:
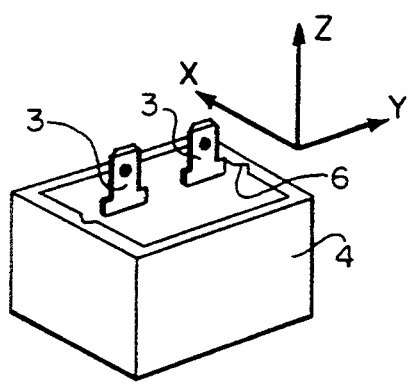
FIG. 7 is a perspective view of the different polygonal capacitor illustrating positioning of terminals thereof.
Figure 8:
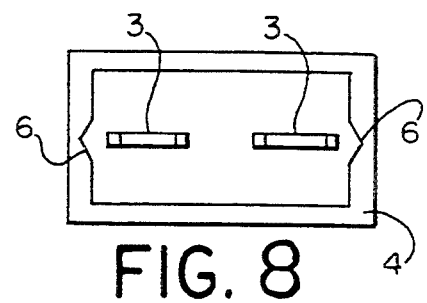
FIG. 8 is a plan view of the conventional capacitor shown in FIG. 7.
Figure 9:
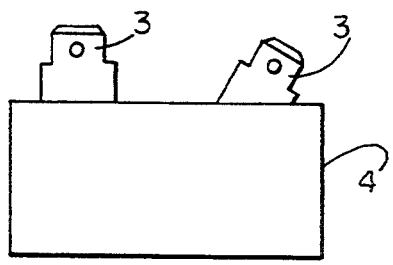
FIGS. 9 and 10 are views illustrating deficiencies of the conventional polygonal capacitor shown in FIG. 7.
Figure 10:
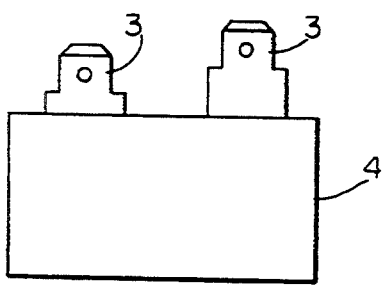

Hereinafter, the present invention will be described by way of illustrating examples with reference to the accompanying drawings.

EXAMPLE 1

With reference to FIGS. 1A through 1C, 2 and 3, a polygonal capacitor according to a first example of the present invention will be described.

A polygonal capacitor A includes a capacitor element 1, a case 4 accommodating the capacitor element 1, a terminal attachment component 8 for attaching terminals to the case 4, and a resin 5 filled between the case 4 and the capacitor element 1.

The capacitor element 1 is produced in the following manner. A metal such as aluminum or zinc is evaporated on a surface of an insulating film such as a polyester film or a polypropylene film, thereby forming a metallized film. The metallized film is wound into a roll, and then a metal such as zinc is welded to two end surfaces of the roll of the metallized film in an axial direction thereof, thereby forming metal layers 2 each acting as an electrode.

As is shown in FIG. 2, the terminal attachment component 8 includes a pair of terminals 3 and an insulating terminal base 7. The terminals 3 and the insulating terminal base 7 are integrally molded with an insulating resin in a state where the terminals 3 are inserted into the insulating terminal base 7. Accordingly, an end of each terminal 3 is projected from a surface of the insulating terminal base 7, and a leg portion at another end of each terminal 3 is projected from another surface of the insulating terminal base 7.

Two ends of the insulating terminal base 7 each have an engaging projection 7a having a triangular horizontal cross section. Further, the engaging projection 7a has a tapered portion 7b at an end surface thereof. Since the terminals 3 and the insulating terminal base 7 are integrally molded, the terminals 3 are positionally secured with respect to the insulating terminal base 7 with a high precision.

The leg portions 3a of the terminal attachment component 8 are respectively welded to the metal layers 2. Two inner surfaces of the case 4 each have an engaging groove 4a having a V-shaped cross section and extended substantially perpendicularly from a perimeter of an opening of the case 4.

The capacitor element 1 welded with the terminal attachment component 8 is accommodated in the case 4 in a state where the engaging projections 7a are in engagement with the engaging grooves 4a. The capacitor element 1 may be in contact with or out of contact from a bottom surface of the case 4.

As the resin 5, a curing resin such as an epoxy resin or a urethane resin is used. The resin 5 is injected into the case 4 in a fluid form and then cured.

The polygonal capacitor A is produced in the following manner.

First, the leg portions 3a of the terminals 3 are respectively welded to the metal layers 2 formed on the capacitor element 1. Next, the capacitor element 1 is put into the case 4 in a state where the engaging projections 7a of the insulating terminal base 7 is in engagement with the engaging grooves 4a of the case 4. The distance between inner surfaces of the engaging grooves 4a and the length and the shape of the insulating terminal base 7 are determined so that the engaging projections 7a are in pressure contact with the inner surfaces of the engaging grooves 4a. Finally, the resin 5 in a fluid form is injected into the case 4 and cured.

In the capacitor A produced in the above-described manner, the positional relationship between the terminals 3 and the case 4 is determined as specified in the X direction (FIG. 7) by the engagement between the engaging grooves 4a and the engaging projections 7a. In the Y and Z directions, the above positional relationship is determined as specified by the fixation of the terminals 3 to the insulating terminal base 7.

A component assembly shown in FIG. 3 is suitable for automatically welding the terminals 3 to the capacitor element 1. The component assembly is constituted by a plurality of terminal attachment components 8 which are integrally molded in a state where each pair of the leg portions 3a are connected to the insulating terminal base 7 of an adjacent terminal attachment component. The component assembly is supplied to a welding machine for welding the leg portions 3a to the metal layers 2, and the terminal attachment components 8 are cut away one by one at positions shown by reference numeral 10. Then, a tip of each leg portion 3a is welded to the metal layer 2. In this manner, the terminals 3 can be connected to the capacitor element 1 with a high precision, and further the production efficiency of the capacitors A can be improved.

EXAMPLE 2

FIG. 4 shows a case 4 of a polygonal capacitor according to a second example of the present invention.

The polygonal capacitor according to the second example is distinct from the polygonal capacitor according to the first example in that the groove 9 formed at each of the two inner surfaces of the case 4 has a certain depth from a perimeter of the opening of the case 4. Each engaging projection 7a is supported by a bottom surface of the groove 9. In such a case also, the positional relationship of the terminals 3 with respect to the case 4 in the Z direction (FIG. 7) is determined as specified.

Although each engaging projections 7a has a triangle horizontal cross section, and each engaging grooves 3a has a V-shaped cross section in the above examples, the engaging projections and the engaging grooves may have an arbitrary profile.

The case 4 may have an engaging projection on an inner surface thereof, in which case the insulating terminal base 7 has an engaging groove, which is engageable with the engaging projection, at an end thereof.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A polygonal capacitor, comprising:
   a polygonal capacitor case having an engaging groove at an inner surface thereof;
   a capacitor element accommodated in the polygonal capacitor case;
   a plurality of terminals respectively connected to a plurality of electrodes of the capacitor element through a base portion of each terminal;
   an insulating terminal base to which the terminals are fixed; and
   a resin filled in the polygonal capacitor case,
   wherein the terminals and the insulating terminal base are integrally molded in a state where the terminals are inserted into the insulating terminal base;
   wherein an engaging projection is formed at the insulating terminal base, the engaging projection being tapered along a direction in which the insulating terminal base is inserted into the case; and
   wherein the engaging projection is in pressure contact with the engaging groove of the polygonal capacitor case.

2. A polygonal capacitor according to claim 1, wherein two such terminals are fixed to the insulating terminal base, and the base portion of each terminal is a leg portion which is connected to the respective electrode of the capacitor element.

3. A polygonal capacitor according to claim 1, wherein the terminals and the insulating terminal base are obtained from a component assembly including a plurality of terminal attachment members, each having at least two such terminals and such an insulating terminal base.

4. A polygonal capacitor according to claim 1, wherein said insulating terminal base is surrounded by said resin.

5. A polygonal capacitor, comprising:
   a capacitor element having a plurality of metal layers, each acting as an electrode;
   a plurality of terminals respectively connected to the metal layers of the capacitor element;
   a polygonal capacitor case accommodating the capacitor element; and
   an insulating resin filled between the polygonal capacitor case and the capacitor element,
   wherein:
   the terminals and an insulating terminal base formed of a resin are integrally molded and used as a terminal attachment member in a state where the terminals are inserted into the insulating terminal base;
   the insulating terminal base has an engaging projection, the engaging projection being tapered along a direction in which the insulating terminal base is inserted into the case;
   the polygonal terminal case has an engaging groove formed at an inner surface thereof, the engaging groove being engageable with the engaging projection;
   the terminals of the terminal attachment member are respectively connected to the metal layers of the capacitor element; and
   the capacitor element is accommodated in the polygonal capacitor case in a state where the engaging projection of the insulating terminal base is in engagement with the engaging groove.

6. A method for producing a polygonal capacitor comprising:
- a capacitor element having a plurality of metal layers, each acting as an electrode;
- a plurality of terminals respectively connected to the metal layers of the capacitor element;
- a polygonal capacitor case accommodating the capacitor element; and
- an insulating resin filled between the polygonal capacitor case and the capacitor element, wherein:
- the terminals and an insulating terminal base formed of a resin are integrally molded and used as a terminal attachment member in a state where the terminals are inserted into the insulating terminal base;
- the insulating terminal base has an engaging projection, the engaging projection being tapered along a direction in which the insulating terminal base is inserted into the case;
- the polygonal terminal case has an engaging groove formed at an inner surface thereof, the engaging groove being engageable with the engaging projection;
- the terminals of the terminal attachment member are respectively connected to the metal layers of the capacitor element; and
- the capacitor element is accommodated in the polygonal capacitor case in a state where the engaging projection of the insulating terminal base is in engagement with the engaging groove,
- wherein the method comprises a step of connecting the terminals to the capacitor element while separating the terminal attachment member from a composite including a plurality of such terminal attachment members connected in series to one another.

7. A method according to claim 6, wherein the step of connecting the terminals to the capacitor element includes supplying the composite to a molding machine, cutting away the terminal attachment members one by one, and welding a tip of a leg portion of each terminal to a metal layer of the capacitor element.

* * * * *